(12) United States Patent
Archer et al.

(10) Patent No.: US 7,706,275 B2
(45) Date of Patent: Apr. 27, 2010

(54) METHOD AND APPARATUS FOR ROUTING DATA IN AN INTER-NODAL COMMUNICATIONS LATTICE OF A MASSIVELY PARALLEL COMPUTER SYSTEM BY EMPLOYING BANDWIDTH SHELLS AT AREAS OF OVERUTILIZATION

(75) Inventors: Charles Jens Archer, Rochester, MN (US); Roy Glenn Musselman, Rochester, MN (US); Amanda Peters, Rochester, MN (US); Kurt Walter Pinnow, Rochester, MN (US); Brent Allen Swartz, Chippewa Falls, WI (US); Brian Paul Wallenfelt, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 11/672,315

(22) Filed: Feb. 7, 2007

(65) Prior Publication Data
US 2008/0186853 A1    Aug. 7, 2008

(51) Int. Cl.
*G01R 31/08* (2006.01)
(52) U.S. Cl. .................. 370/235; 370/389; 709/240
(58) Field of Classification Search ......... 370/200–253, 370/272–309, 431–546; 709/240
See application file for complete search history.

(56) References Cited

U.S. PATENT DOCUMENTS

| | | | | |
|---|---|---|---|---|
| 5,050,162 A | * | 9/1991 | Golestani | 370/235 |
| 5,218,676 A | * | 6/1993 | Ben-Ayed et al. | 709/240 |
| 5,347,450 A | | 9/1994 | Nugent | |
| 5,835,482 A | * | 11/1998 | Allen | 370/225 |
| 5,933,425 A | | 8/1999 | Iwata | |
| 5,995,503 A | | 11/1999 | Crawley et al. | |
| 6,748,413 B1 | | 6/2004 | Bournas | |
| 6,901,052 B2 | * | 5/2005 | Buskirk et al. | 370/235 |
| 2004/0001508 A1 | | 1/2004 | Zheng et al. | |
| 2006/0002424 A1 | | 1/2006 | Gadde | |
| 2008/0016249 A1 | | 1/2008 | Ellis et al. | |

OTHER PUBLICATIONS

A Gara et al., "Overview of the Blue Gene/L System Architecture" (IBM Journal of Research & Development, vol. 49, Nos. 2/3, Mar./May 2005, pp. 195-211).

N.R. Adiga et al, "Blue Gene/L Torus Interconnection Network" (IBM Journal of Research & Development, vol. 49, Nos. 2/3, Mar./May 2005, pp. 265-276).

(Continued)

*Primary Examiner*—Ricky Ngo
*Assistant Examiner*—Iqbal Zaidi
(74) *Attorney, Agent, or Firm*—Roy W. Truelson

(57) ABSTRACT

A massively parallel computer system contains an inter-nodal communications network of node-to-node links. An automated routing strategy routes packets through one or more intermediate nodes of the network to reach a final destination. The default routing strategy is altered responsive to detection of overutilization of a particular path of one or more links, and at least some traffic is re-routed by distributing the traffic among multiple paths (which may include the default path). An alternative path may require a greater number of link traversals to reach the destination node.

20 Claims, 9 Drawing Sheets

OTHER PUBLICATIONS

M. Barnett et al., Broadcasting on Meshes with Worm-Hole Routing (Second Revised Version, 1995).

Ribler, Randy L. et al., "The Autopilot performance-directed adaptive control system", Future Generations Computer Systems, Elsevier Science Publications, Amsterdam, NL, vol. 18, No. 1, Sep. 1, 2001, pp. 175-187.

Zhang, Yan et al., "Automatic Performance Tuning for J2EE Application Server Systems", Lecture Notes in Computer Science, vol. 3806, 2005, pp. 520-527.

Chung, I-Hsin et al., "Automated cluster-based web service performance tuning", High Performance distributed Computing, 2004, Proceedings of teh 13th IEEE International Symposium on Honolulu, HI, USA, Jun. 4-6, 2004, Piscataway, NJ, USA, IEEE, Jun. 4, 2004, pp. 36-44.

Hondroudakis, Anna et al., "An Empirically Derived Framework for Classifying Parallel Program Performance Tuning Problems", Proceedings of the Sigmetrics Symposium on Parallel and distributed Tools, SPDT 1998, Welches, OR, Aug. 3-4, 1998. Sigmetrics Symposium on Parallel and Distributed Tools, New York, NY, US, ACM, vol. SYMP 2, Aug. 3, 1998, pp. 112-123.

* cited by examiner

METHOD AND APPARATUS FOR ROUTING DATA IN AN INTER-NODAL COMMUNICATIONS LATTICE OF A MASSIVELY PARALLEL COMPUTER SYSTEM BY EMPLOYING BANDWIDTH SHELLS AT AREAS OF OVERUTILIZATION

STATEMENT REGARDING FEDERALLY SPONSORED RESEARCH OR DEVELOPMENT

This invention was made with Government support under Contract No. B519700 awarded by the Department of Energy. The Government has certain rights in this invention.

CROSS REFERENCE TO RELATED APPLICATIONS

The present application is related to the following commonly assigned copending U.S. patent applications, all of which are herein incorporated by reference:

U.S. patent application Ser. No. 11/539,300, filed Oct. 6, 2006, entitled "Method and Apparatus for Routing Data in an Inter-Nodal Communications Lattice of a Massively Parallel Computer System by Routing Through Transporter Nodes";

U.S. patent application Ser. No. 11/539,248, filed Oct. 6, 2006, entitled "Method and Apparatus for Routing Data in an Inter-Nodal Communications Lattice of a Massively Parallel Computer System by Dynamic Global Mapping of Contended Links";

U.S. patent application Ser. No. 11/539,270, filed Oct. 6, 2006, entitled "Method and Apparatus for Routing Data in an Inter-Nodal Communications Lattice of a Massively Parallel Computer System by Semi-Randomly Varying Routing Policies for Different Packets"; and U.S. patent application Ser. No. 11/539,329, filed Oct. 6, 2006, entitled "Method and Apparatus for Routing Data in an Inter-Nodal Communications Lattice of a Massively Parallel Computer System by Dynamically Adjusting Local Routing Strategies".

FIELD OF THE INVENTION

The present invention relates to digital data processing, and in particular to the operation of massively parallel computer systems comprising multiple nodes arranged in a regular matrix.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using multiple processors. The modest cost of individual processors packaged on integrated circuit chips has made this approach practical. Although the use of multiple processors creates additional complexity by introducing numerous architectural issues involving data coherency, conflicts for scarce resources, and so forth, it does provide the extra processing power needed to increase system throughput.

Various types of multi-processor systems exist, but one such type of system is a massively parallel nodal system for computationally intensive applications. Such a system typically contains a large number of processing nodes, each node having its own processor or processors and local (nodal) memory, where the nodes are arranged in a regular matrix or lattice structure for inter-nodal communication. The inter-nodal communications lattice allows different sub-processes of an application executing in parallel on different nodes to exchange data with one another. Typically, such a system further contains a control mechanism for controlling the operation of the nodes, and an I/O mechanism for loading data into the nodes from one or more I/O devices and receiving output from the nodes to the I/O device(s). In general, each node acts as an independent computer system in that the addressable memory used by the processor is contained entirely within the processor's local node, and the processor has no capability to directly reference data addresses in other nodes. However, the control mechanism and I/O mechanism are shared by all the nodes.

A massively parallel nodal system such as described above is a general-purpose computer system in the sense that it is capable of executing general-purpose applications, but it is designed for optimum efficiency when executing parallel, computationally intensive applications, i.e., applications in which the proportion of computational processing and communication among parallel processes relative to I/O processing and I/O data transfer is relatively high. In such an application environment, most of the data entering and leaving a node is being communicated to other nodes as part of the application being processed in parallel. Therefore, it is important that the inter-nodal communications mechanism be designed to accommodate a large volume of data. Such an inter-nodal communications mechanism should support communication between any arbitrary pair of nodes (to avoid placing limitations on the types of applications which can be executed), but need not support communications between all possible node pairs with equal efficiency or latency. An inter-nodal data communications lattice provides a set of node-to-node communications links arranged in a regular pattern likely to be useful for processing large processing applications in parallel, without providing a direct connection between any two arbitrary nodes. Data can be sent via this lattice between any arbitrary pair of nodes either directly (where such a direct connection exists) or by passing through one or more intermediate nodes.

An exemplary massively parallel nodal system is the IBM Blue Gene™ system. The IBM Blue Gene system contains many processing nodes, each having multiple processors and a common local (nodal) memory. The processing nodes are arranged in a logical three-dimensional torus network having point-to-point data communication links between each node and its immediate neighbors in the network. Additionally, each node can be configured to operate either as a single node or multiple virtual nodes (one for each processor within the node), thus providing a fourth dimension of the logical network. A large processing application typically creates one ore more blocks of nodes, herein referred to as communicator sets, for performing specific sub-tasks during execution. The application may have an arbitrary number of such communicator sets, which may be created or dissolved at multiple points during application execution.

Where it is necessary to route data through one or more intermediate nodes of the inter-nodal communications lattice, there are generally multiple possible routes, and some methodology will be used to determine the routing. For ease of implementation and low management overhead, it is generally desirable to implement a simple, deterministic routing policy, such as a policy in which the locations of the sending node and receiving node automatically determine a routing, so that all data from a given sender to a given receiver follows the same route. Such a policy often produces good results, but there are situations in which it is less than optimal.

Frequently, network traffic is not randomly or evenly distributed, but is bursty in nature. In particularly, in some environments, a relatively small number of sending nodes are generating a disproportionately large volume of traffic to respective receiving nodes. Such uneven distribution of network traffic causes certain links to become heavily burdened while other links are underutilized.

Improper routing of messages and distribution of network traffic in a massively parallel system can significantly affect the overall performance of the system. Large applications executing in such systems often require substantial inter-nodal communication of data. Network bottlenecks increase latency times for data to be exchanged, and may cause sub-processes executing in individual nodes to wait for data from other nodes, further affecting performance.

A need exists for improved tools or methods for routing data in an inter-nodal communications network of a massively parallel system.

SUMMARY OF THE INVENTION

A massively parallel computer system contains an inter-nodal communications network of node-to-node links, each node being coupled to multiple other nodes by multiple respective links. An automated routing strategy enables the nodes to route packets through one or more intermediate nodes of the network to reach a final destination. However, because the automated routing strategy alone may cause certain links to become congested, at least some traffic is distributed among multiple paths responsive to detecting overutilization of one or more links.

In the preferred embodiment, the original transmitting node (source node) determines that an overutilization condition exists or will be caused along a default path to be used for routing packets to a destination node. Responsive to determining the overutilization condition, the source node determines at least one alternative path for the packets. In some circumstances, the alternative path routing may require a greater number of link traversals to reach the destination node. The source node transmits the packets to the destination in a distributed manner among multiple paths (which may include the default path) A first alternative path may be chosen based on a degree of usage or contention in the alternative paths, with subsequent transmissions being rotated among the multiple possible alternative initial links on a round-robin basis, although traffic could be distributed among the multiple possible alternatives using a different technique.

In the preferred embodiment, the source node specifies a routing policy for a packet from among a plurality of possible routing policy choices. Specifically, in the preferred embodiment in which the network is arranged in a logical matrix of three dimensions, the routing policy is constrained to follow a minimal path and specifies an order of preference for particular dimensions, there being only six possibilities in three dimensions. The chosen routing policy is associated with the packet and transmitted with the packet. All intermediate nodes in the path determine a routing to the next node based on the routing policy chosen by the source node. Where the alternative path is not a minimal path, the source node routes the packet to a transporter node along a minimal path to the transporter, and the transporter then re-routes the packet to the destination.

The routing of packets using multiple alternative routes around local areas of contention, as described herein, can be used in conjunction with any or all of various alternative or additional techniques for improving network efficiency, several of which are described herein and/or in the related applications.

By routing selective packets in a distributed manner around local areas of contention, certain acute network contention can be alleviated in a manner which is generally nondisruptive of default routing mechanisms and which does not require significant overhead of implementation. In particular, where a single source node expects to send a large volume of data to a single destination node, the data can be sent along multiple paths, thus reducing the volume sent along any particular network path and reducing local contention. Such a method solves certain acute contention problems without foreclosing other, more elaborate or generalized, techniques for improving network performance.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
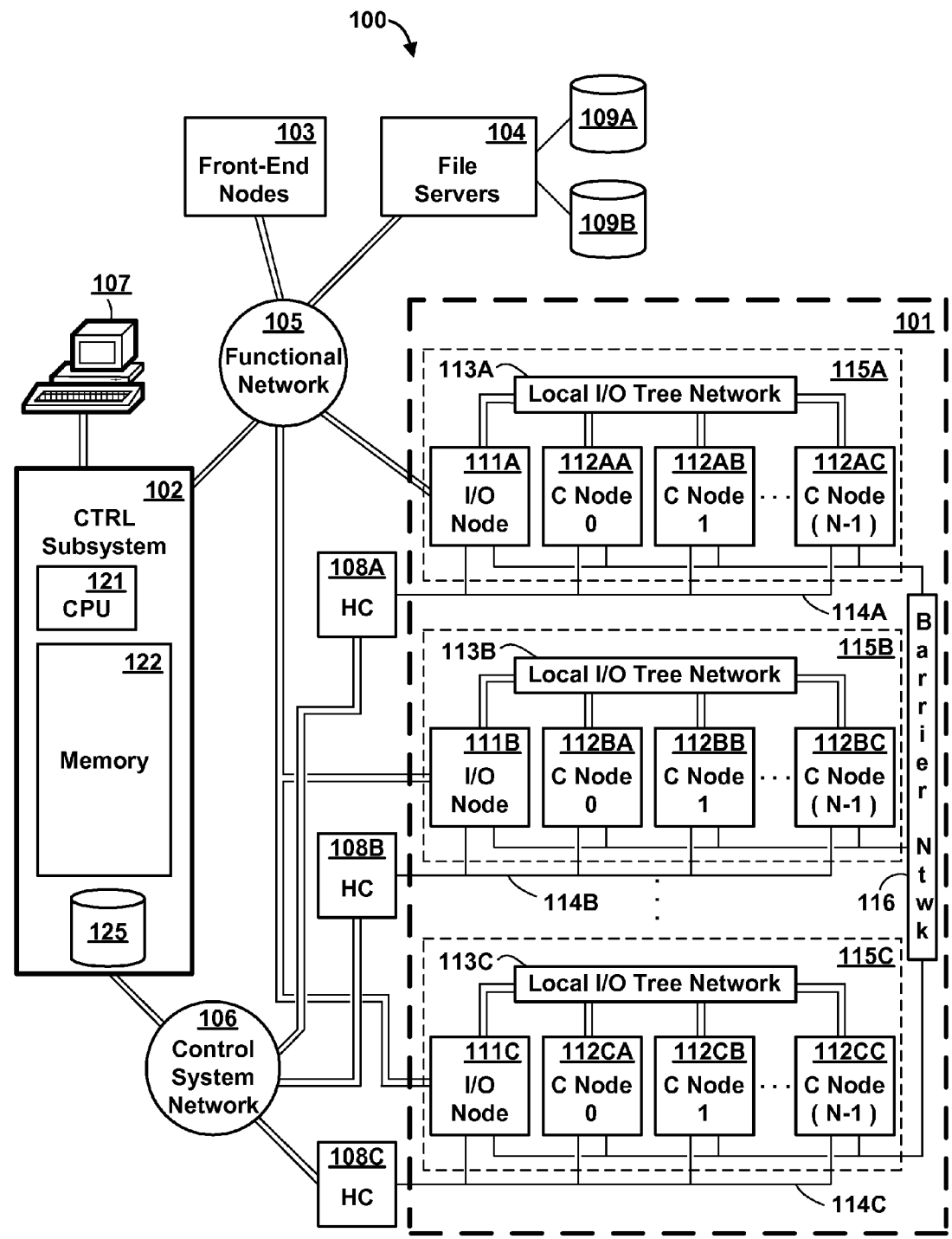
FIG. 1 is a high-level block diagram of the major components of a massively parallel computer system, in accordance with the preferred embodiment of the present invention.

Referring to the Drawing, wherein like numbers denote like parts throughout the several views, FIG. 1 is a high-level block diagram of the major hardware components of a massively parallel computer system 100 in accordance with the preferred embodiment of the present invention. In the preferred embodiment, computer system 100 is an IBM Blue Gene™ computer system, it being understood that other computer systems could be used, and the description of a preferred embodiment herein is not intended to limit the present invention to the particular architecture described. In addition to those applications cited above in the Cross Reference to Related Applications, further background information concerning the architecture of an IBM Blue Gene™ computer system can be found in the following commonly owned, copending U.S. patent applications and PCT application designating the United States, each of which is herein incorporated by reference:

U.S. patent application Ser. No. 10/468,991, filed Feb. 25, 2002, entitled "Arithmetic Functions in Torus and Tree Network";

U.S. patent application Ser. No. 10/469,000, filed Feb. 25, 2002, entitled "Global Tree Network for Computing Structure";

U.S. patent application Ser. No. 10/468,993, filed Feb. 25, 2002, entitled "Novel Massively Parallel Supercomputer";

U.S. patent application Ser. No. 10/468,996, filed Feb. 25, 2002, entitled "Fault Isolation Through No-Overhead Link Level CRC";

U.S. patent application Ser. No. 10/468,997, filed Feb. 25, 2002, entitled "Global Interrupt and Barrier Networks";

PCT patent application US 2005/025616, filed Jul. 19, 2004, entitled "Collective Network for Computer Structures", published as WO 2006/020298 A2;

U.S. patent application Ser. No. 11/279,620, filed Apr. 13, 2006, entitled "Executing an Allgather Operation on a Parallel Computer"; and U.S. patent application Ser. No. 11/624,942, filed Jan. 19, 2007, entitled "Method and Apparatus for Operating a Massively Parallel Computer System to Utilize Idle Processor Capability at Process Synchronization Points.

Computer system 100 comprises a compute core 101 having a large number of compute nodes logically arranged for inter-nodal communication in a regular array or lattice, which collectively perform the bulk of the useful work performed by system 100. The operation of computer system 100 including compute core 101 is generally controlled by control subsystem 102. Various additional processors contained in frontend nodes 103 perform certain auxiliary data processing functions, and file servers 104 provide an interface to data storage devices such as rotating magnetic disk drives 109A, 109B or other I/O (not shown). Functional network 105 provides the primary data communications path among the compute core 101 and other system components. For example, data stored in storage devices attached to file servers 104 is loaded and stored to other system components through functional network 105.

Compute core 101 comprises I/O nodes 111A-C (herein generically referred to as feature 111) and compute nodes 112AA-AC, 112BA-BC, 112CA-CC (herein generically referred to as feature 112). Compute nodes 112 are the workhorse of the massively parallel system 100, and are intended for executing compute-intensive applications which may require a large number of processes proceeding in parallel. I/O nodes 111 handle I/O operations on behalf of the compute nodes. Each I/O node contains an I/O processor and I/O interface hardware for handling I/O operations for a respective set of N compute nodes 112, the I/O node and its respective set of N compute nodes being referred to as a Pset. Compute core 101 contains M Psets 115A-C (herein generically referred to as feature 115), each containing a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by the compute core for executing user application processes, as well as data output produced by the compute core as a result of executing user application processes, is communicated externally of the compute core over functional network 105. The compute nodes within a Pset 115 communicate with the corresponding I/O node over a corresponding local I/O tree network 113A-C (herein generically referred to as feature 113), which is described in greater detail herein. The I/O nodes in turn are attached to functional network 105, over which they communicate with I/O devices attached to file servers 104, or with other system components. Functional network 105 thus handles all the I/O for the compute nodes, and requires a very large bandwidth. Functional network 105 is, in the preferred embodiment, a set of gigabit Ethernet interfaces to multiple Ethernet switches. The local I/O tree networks 113 may be viewed logically as extensions of functional network 105, since I/O operations proceed through both networks, although they are physically separated from functional network 105 and observe different protocols.

Control subsystem 102 directs the operation of the compute nodes 112 in compute core 101. Control subsystem 102 is preferably a mini-computer system including its own processor or processors 121 (of which one is shown in FIG. 1), internal memory 122, and local storage 125, and having an attached console 107 for interfacing with a system administrator or similar person. Control subsystem 102 includes an internal database which maintains certain state information for the compute nodes in core 101, and various control and/or maintenance applications which execute on the control subsystem's processor(s) 121, and which control the allocation of hardware in compute core 101, direct the pre-loading of data to the compute nodes, and perform certain diagnostic and maintenance functions. Control system communicates control and state information with the nodes of compute core 101 over control system network 106. Network 106 is coupled to a set of hardware controllers 108A-C (herein generically referred to as feature 108). Each hardware controller communicates with the nodes of a respective Pset 115 over a corresponding local hardware control network 114A-C (herein generically referred to as feature 114). The hardware controllers 108 and local hardware control networks 114 may be considered logically as extensions of control system network 106, although they are physically separate. The control system network and local hardware control network operate at significantly lower data rates than the functional network 105.

In addition to control subsystem 102, front-end nodes 103 comprise a collection of processors and memories which perform certain auxiliary functions which, for reasons of efficiency or otherwise, are best performed outside the compute core. Functions which involve substantial I/O operations are generally performed in the front-end nodes. For example, interactive data input, application code editing, or other user interface functions are generally handled by front-end nodes 103, as is application code compilation. Front-end nodes 103 are coupled to functional network 105 for communication with file servers 104, and may include or be coupled to interactive workstations (not shown).

Figure 2:
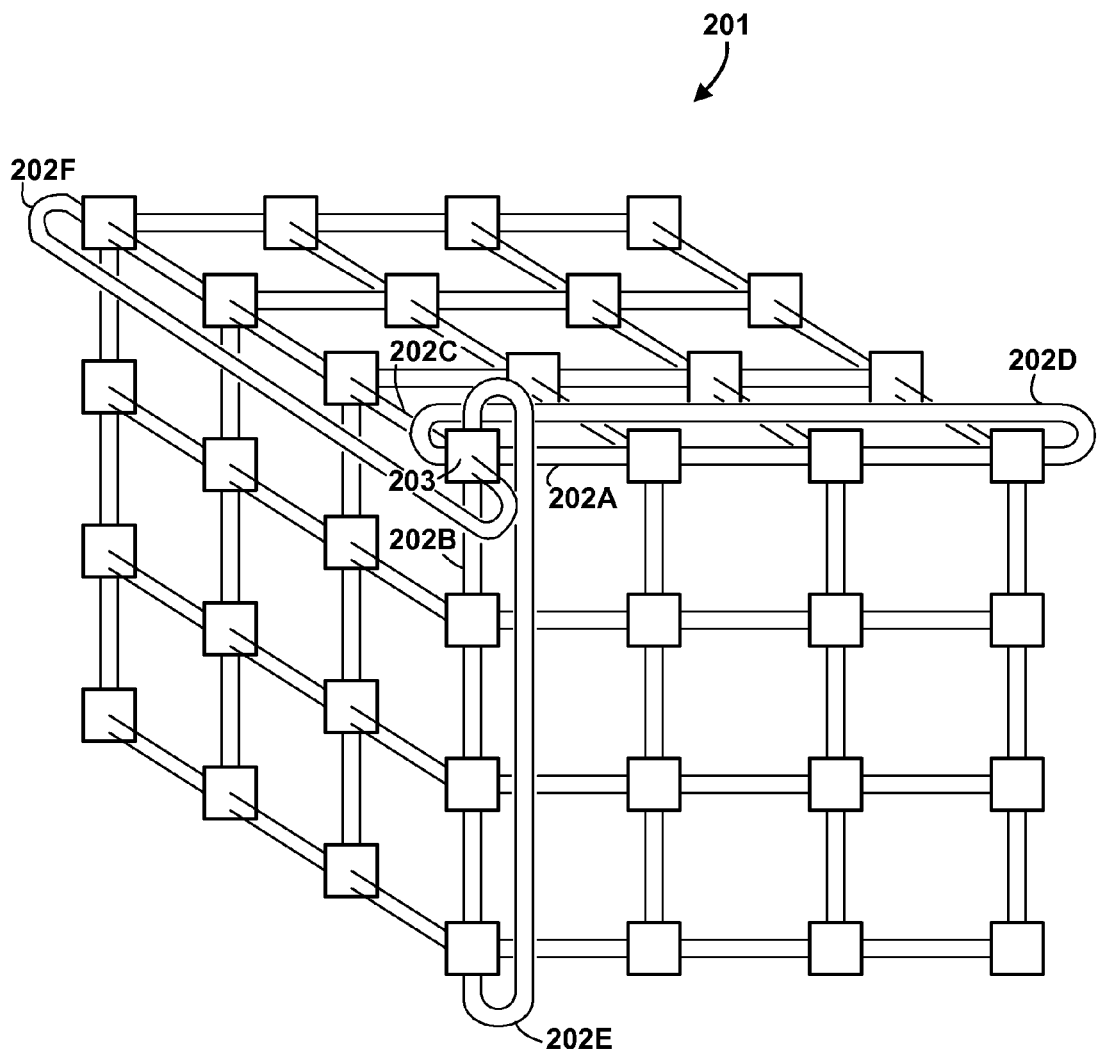
FIG. 2 is a simplified representation of a three dimensional lattice structure and inter-nodal communication network of the system of FIG. 1, according to the preferred embodiment.

Compute nodes 112 are logically arranged for inter-nodal communication in a three dimensional lattice, each compute node having a respective x, y and z coordinate. FIG. 2 is a simplified representation of the three dimensional lattice structure 201, according to the preferred embodiment. Referring to FIG. 2, a simplified 4×4×4 lattice is shown, in which the interior nodes of the lattice are omitted for clarity of illustration. Although a 4×4×4 lattice (having 64 nodes) is represented in the simplified illustration of FIG. 2, it will be understood that the actual number of compute nodes in the lattice is typically much larger. Each compute node in lattice 201 contains a set of six bidirectional node-to-node communication links 202A-F (herein referred to generically as feature 202) for communicating data with its six immediate neighbors in the x, y and z coordinate dimensions. Each link is referred to herein as "bidirectional" in the logical sense since data can be sent in either direction; it is physically constructed as a pair of unidirectional links.

As used herein, the term "lattice" includes any regular pattern of nodes and inter-nodal data communications paths in more than one dimension, such that each node has a respective defined set of neighbors, and such that, for any given node, it is possible to algorithmically determine the set of neighbors of the given node from the known lattice structure and the location of the given node in the lattice. A "neighbor" of a given node is any node which is linked to the given node by a direct inter-nodal data communications path, i.e. a path which does not have to traverse another node. A "lattice" may be three-dimensional, as shown in FIG. 2, or may have more or fewer dimensions. The lattice structure is a logical one, based on inter-nodal communications paths. Obviously, in the physical world, it is impossible to create physical structures having more than three dimensions, but inter-nodal communications paths can be created in an arbitrary number of dimensions. It is not necessarily true that a given node's neighbors are physically the closest nodes to the given node, although it is generally desirable to arrange the nodes in such a manner, insofar as possible, as to provide physical proximity of neighbors.

In the preferred embodiment, the node lattice logically wraps to form a torus in all three coordinate directions, and thus has no boundary nodes. E.g., if the node lattice contains dimx nodes in the x-coordinate dimension ranging from 0 to (dimx−1), then the neighbors of Node((dimx−1), y0, z0) include Node((dimx−2), y0, z0) and Node (0, y0, z0), and similarly for the y-coordinate and z-coordinate dimensions. This is represented in FIG. 2 by links 202D, 202E, 202F which wrap around from a last node in an x, y and z dimension, respectively to a first, so that node 203, although it appears to be at a "corner" of the lattice, has six node-to-node links 202A-F. It will be understood that, although this arrangement is a preferred embodiment, a logical torus without boundary nodes is not necessarily a requirement of a lattice structure.

The aggregation of node-to-node communication links 202 is referred to herein as the torus network. The torus network permits each compute node to communicate results of data processing tasks to neighboring nodes for further processing in certain applications which successively process data in different nodes. However, it will be observed that the torus network contains only a limited number of links, and data flow is optimally supported when running generally parallel to the x, y or z coordinate dimensions, and when running to successive neighboring nodes. Preferably, applications take advantage of the lattice structure by subdividing computation tasks so that much of the data flows to neighboring nodes and along logical paths of the lattice. However, it is impossible to ensure that all inter-nodal communication is local in nature, and there will be a significant amount of network traffic which must traverse multiple nodes, and in some cases must traverse many nodes. A routing mechanism, described in greater detail herein, determines how to route data packets through successive nodes and links of the lattice.

The torus network provides general node-to-node data exchange for application state data generated as a result of executing an application on multiple nodes in parallel. In addition to the torus network, an I/O tree network and a collective network, both of which are separate from and independent of the torus network, are used for communicating certain data. The I/O tree network is used for I/O communications, i.e., for transferring data between a node and an I/O device. The collective network is used for certain reduction operations, i.e., operations in which some mathematical function is generated with respect to data collected from all nodes, and for broadcast of data to all nodes. The I/O tree network and collective network share certain hardware, although they are logically independent networks. The torus network is both logically and physically independent of the I/O tree network and collective network. I.e., the torus network does not share physical links with the other networks, nor is the torus network lattice logically dependent on the arrangement of the other networks.

In addition to the torus network, I/O tree network and collective network, an independent barrier network 116 provides certain synchronization and interrupt capabilities. The barrier network contains four independent channels, each channel being logically a global OR over all nodes. Physically, individual node outputs on each channel are combined in hardware and propagate to the top of a combining tree; the resultant signal is then broadcast down the tree to the nodes. A global AND can be achieved by using inverted logic. Generally, the global AND is used as a synchronization barrier to force multiple sub-processes of a common application executing in different nodes to synchronize at some predefined point of progress. The global OR is generally used as an interrupt.

Figure 3:
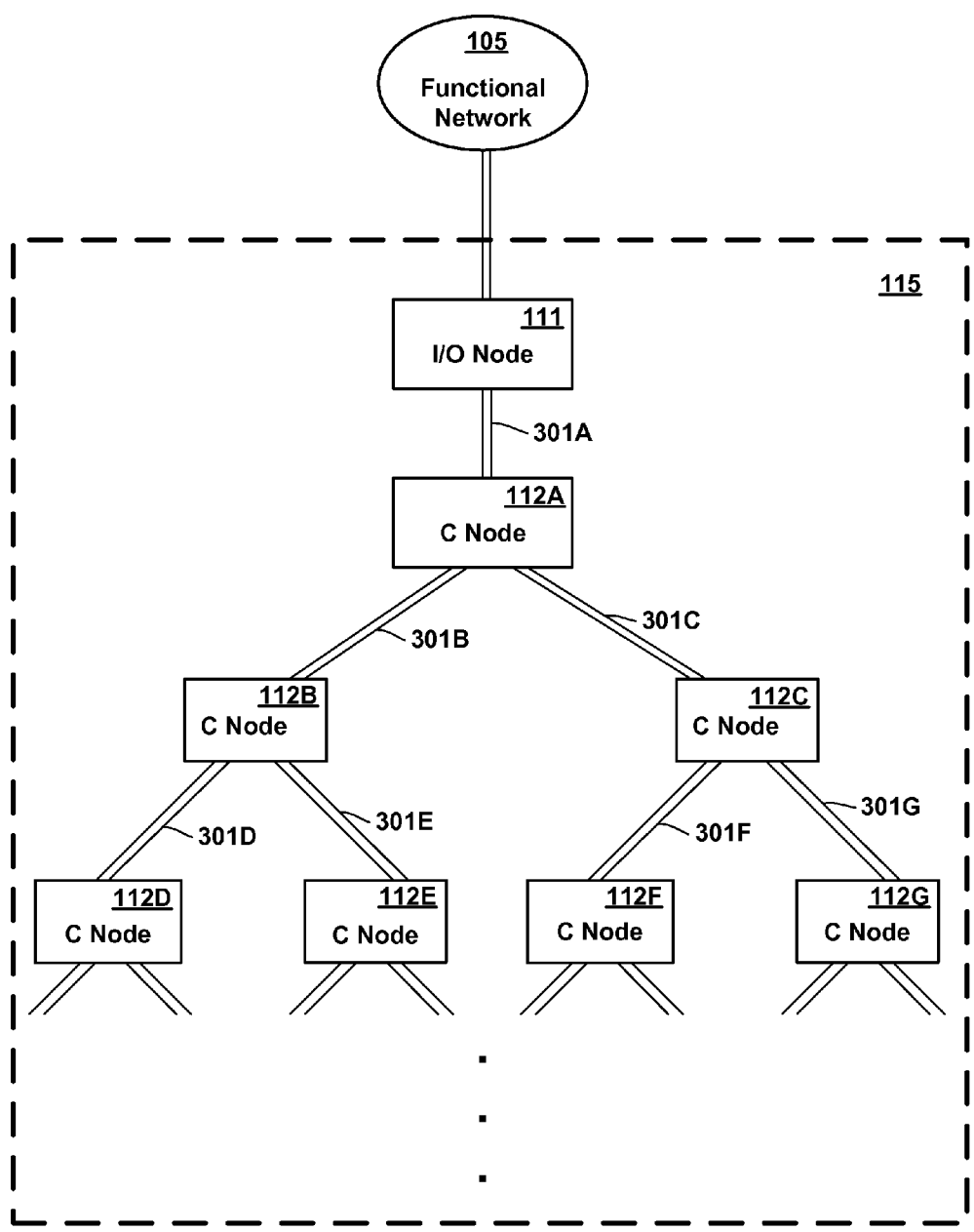
FIG. 3 is a simplified representation of a single subset of compute nodes and associated I/O node connected by a local I/O tree network, according to the preferred embodiment.

FIG. 3 is a simplified representation of a single Pset 115 and its associated local I/O tree network 113, according to the preferred embodiment. Each Pset 115 contains a single I/O node 111, which communicates with functional network 105 using a gigabit Ethernet interface. The compute nodes 112A-G of the Pset are arranged in a binary tree of bidirectional node-to-node communication links 301A-G (herein referred to generically as feature 301). I.e., a binary tree is a tree having a single root node, in which every node has one and only one parent (except the root node, which has no parent), and in which every node has 0, 1 or 2 children. Inbound I/O communications (i.e., those coming from an external device to a compute node) arrive over functional network 105 in I/O node 111, and are transmitted downward on local I/O tree 113 through successive links 301 and intermediate nodes until the destination is reached. Outbound I/O communications are transmitted up the tree 113 to I/O node 111, and thence on the functional network 105.

A separate I/O tree network 113 as represented in FIG. 3 exists for each Pset 115, and each corresponding I/O node 111 has a direct connection with functional network 105. I/O node 111 has one and only one child, which is compute node 112A. Although the representation of FIG. 3 shows two children for every compute node, it will be recognized that some compute nodes may have only one child or have no children.

Figure 4:
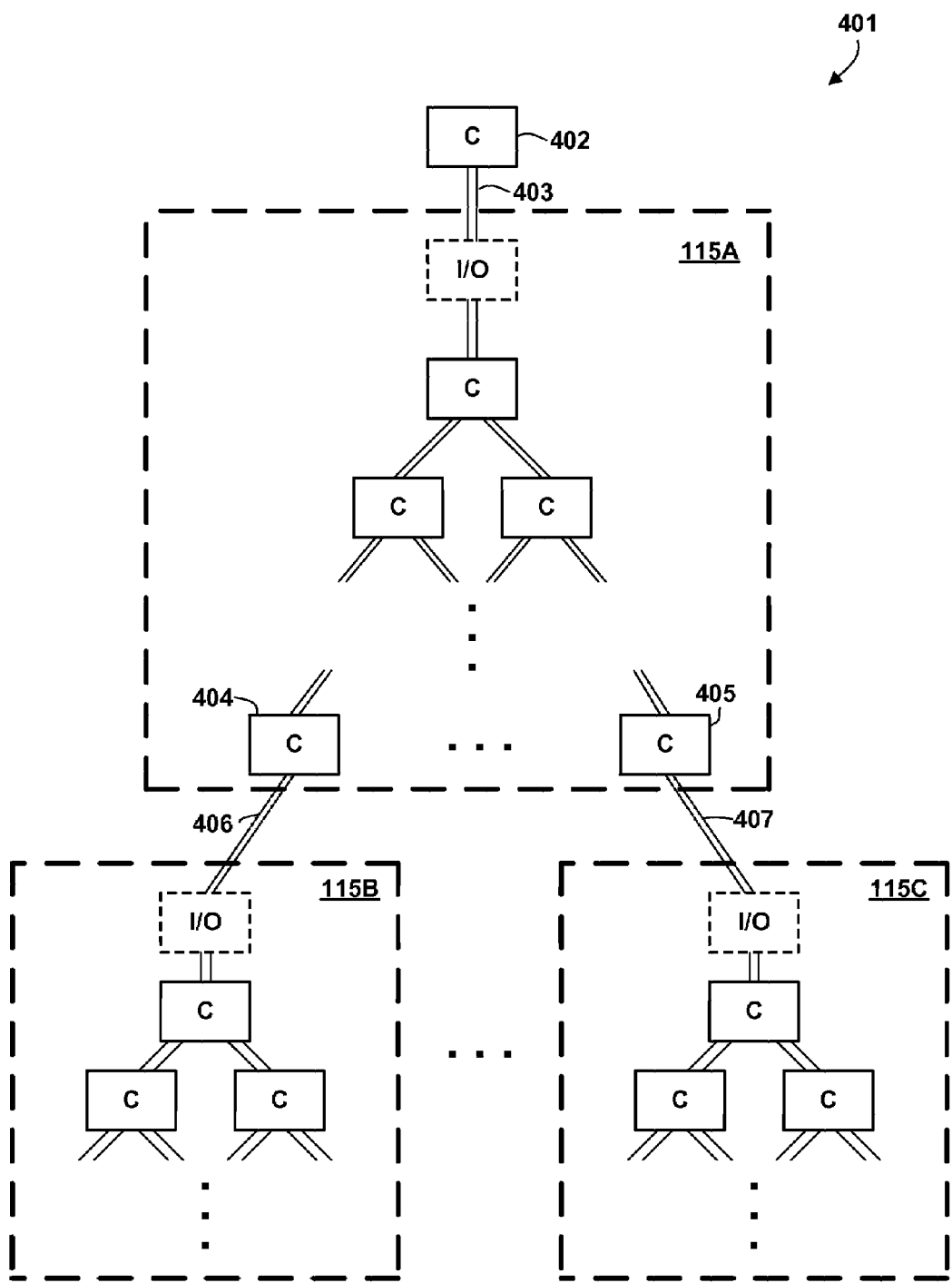
FIG. 4 is a simplified representation of a collective network for certain broadcast and reduction operations, according to the preferred embodiment.

FIG. 4 is a simplified representation of collective network 401, according to the preferred embodiment. Collective network 401 encompasses all the compute nodes 112 in compute core 101. Collective network 401 is logically a single binary tree, having a single compute node 402 at its root.

Physically, the collective network is constructed as a conglomeration of the various local I/O tree networks, which are themselves arranged in a tree. One local I/O network, corresponding to Pset 115A, is at the root of the tree. The I/O node within this network is a child node of root node 402, and communicates directly with root node 402 through bidirectional link 403, which is physically the same as all other links of the local I/O tree network. Root node 402 could alternatively be a compute node in Pset 115A. Additional local I/O tree networks (corresponding to Pset 115B, 115C) are coupled to the root I/O tree network. I.e., each respective I/O node within Pset 115B, 115C is coupled as a child node to respective compute node 404, 405 as parent in Pset 115A via respective bidirectional links 406, 407 (which are physically the same as all other links of the local I/O tree network). Compute nodes 406, 407 are generally leaf nodes of Pset 115A.

In operation, the I/O nodes serve only as conduits for the collective network. Since both the local I/O tree networks 113 and the collective network 401 share the same hardware, each data packet being transmitted on either network contains a field specifying the mode of transmission, i.e., specifying the logical network on which the data packet is being transmitted. If the collective network is specified, the I/O node simply passes the data packet up or down the tree, as the case may be, without further examining it. If the local I/O tree network is specified, the I/O node transmits an outbound data packet on functional network 105. Compute nodes 402, 404, 405 selectively route data in an analogous manner. Thus, although the I/O nodes are physically linked to the collective network, they are not a logical part of the collective network. For this reason they are represented as dashed lines in FIG. 4.

The purpose of the collective network is to support certain reduction and broadcast operations, which necessarily involve all of the compute nodes. Specifically, certain simple mathematical reduction operations can be performed on data gathered from all of the compute nodes to produce composite data. Such data is passed up through the collective network, and at each successive node, data is combined according to the applicable mathematical function be performed to produce resultant composite data for the node and all its children in the collective network. When the data reaches the root node, the resultant composite data at the root node represents the function across all of the compute nodes. Similarly, data can be broadcast to all of the nodes by beginning at the root and, at each successive node, re-transmitting the data to that node's children.

Although the collective network contains physical connections whereby it is possible to communicate data between any arbitrary pair of nodes, it is not efficiently designed for that purpose, nor is it used for that purpose. Node-to-node communication would inevitably burden some nodes (especially the root node) disproportionately. It is the torus network which is designed to support node-to-node communication.

Figure 5:
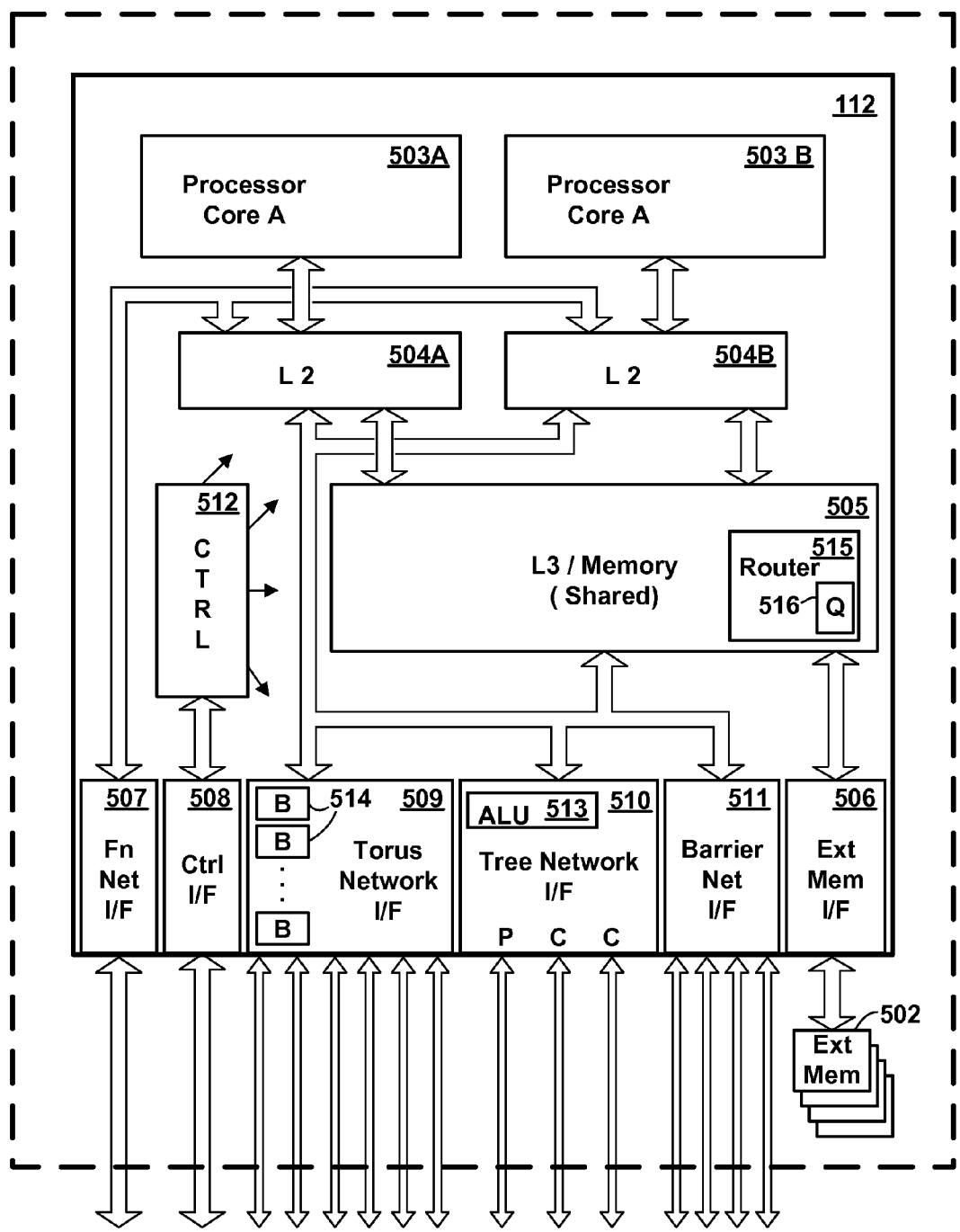
FIG. 5 is a high-level block diagram showing the major hardware components of a node within a compute core, according to the preferred embodiment.

FIG. 5 is a high-level block diagram showing the major hardware components of a node within compute core 101, and in particular shows the major components of a parallel processor application specific integrated circuit (ASIC) chip 501 which forms the heart of the node, according to the preferred embodiment. The node represented in FIG. 5 could be either an I/O node 111 or a compute node 112, although not all interface connections are present in each node type. Each node in compute core 101, whether an I/O node 111 or a compute node 112, contains a single parallel processor ASIC chip 501, the same physical chip design being used for either type node. The node may also contain a number of memory chips 502 external to ASIC 501.

Parallel processor ASIC 501 contains a pair of processor cores 503A, 503B (herein referred to generically as feature 503). From a hardware standpoint, each processor core 503 is an independent processing entity capable of maintaining state for and executing threads independently (although it does not always operate in this mode, as explained below). Specifically, each processor core 503 contains its own instruction state register or instruction address register which records a current instruction being executed, instruction sequencing logic, instruction decode logic, arithmetic logic unit or units, data registers, and various other components required for maintaining thread state and executing a thread, including a floating point unit, level 1 instruction cache and level 1 data cache (not shown). Each processor core is coupled to a respective level 2 (L2) cache 504A, 504B (herein referred to generically as feature 504), which is in turn coupled to a common L3 cache and on-chip memory 505. The internal chip L3 cache/memory 505 communicates through external memory interface 506 to one or more external memory chips 502 in the same node. ASIC 501 and any external memory chips are preferably packaged on a common printed circuit board assembly (not shown).

In addition to external memory interface 506, which does not communicate outside the node in which ASIC 501 resides, parallel processor ASIC 501 contains five separate external data communications interfaces, all of which communicate externally of the node. These interfaces are: functional network interface 507, control network interface 508, torus network interface 509, tree network interface 510, and barrier network interface 511.

Functional network interface 507 is used for communicating through functional network 105, i.e. is in the preferred embodiment a gigabit Ethernet interface. It is coupled directly with the L2 caches 504 via its own chip-internal bus, a design which allows data to be rapidly transferred to or from another network through the L2.caches, and to be manipulated by a processor core 503. The functional network interface hardware is present in all ASICs 501, but it is only used in the I/O nodes 111. In compute nodes 112, the functional network interface is not used, and is not coupled to anything external of the chip.

Control interface 508 is used for communicating with control system network 106 through the hardware controller 108 for the Pset 115 in which the node resides. This network is used primary for system initialization, maintenance, diagnostics, and so forth. As such, it generally does not require large data capacity, and in the preferred embodiment is an IEEE 1149.1 JTAG interface. Control interface 508 is internally coupled to monitoring and control logic 512, which is represented for simplicity as a single entity, although it may be implemented in multiple modules and locations. Monitoring and control logic can access certain registers in processor cores 503 and locations in nodal memory on behalf of control subsystem 102 to read or alter the state of the node, perform diagnostic scanning, and so forth.

Torus network interface 509 provides connections to the six logical node-to-node bidirectional links 202 connecting the node to the torus network. In reality, each link 202 is implemented as a pair of unidirectional links, so torus network interface actually contains twelve ports, six for incoming data and six for outgoing data. In the case of an I/O node 111, torus network interface 509 is not used.

Torus network interface 509 can be used to transmit a data packet originating in the node in which the interface resides to an immediate neighboring node, but much of the traffic handled by the torus network interface is pass-through traffic, i.e., consists of data packets originating in other nodes and destined for other nodes, which pass through the node of the interface on their way to their ultimate destination. The torus network interface includes a set of six outbound data buffers 514, one buffer corresponding to each of the six node-to-node links 202. An incoming data packet to be passed through to another node is placed in one of the outbound data buffers 514 for retransmission, without reading the data into internal chip memory 505 or cache 502. Torus network interface 509 includes routing logic for selecting an appropriate outbound data buffer 514 for retransmission, in accordance with an applicable routing policy, as further explained herein. Thus pass-through data packets impose a minimal burden on the hardware resources of the node (outside the torus network interface). Outbound data originating in the node of the interface is also placed in an appropriate outbound data buffer for transmission. In this case, a software router function 515 executing in the node's processor, which is typically part of a larger computer program such as an operating system, although it could be a stand-alone program, manages a queue 516 of outbound data originating in the node and determines a routing policy for the outbound data, as discussed in further detail herein.

Tree network interface 510 provides connection to the node-to-node bidirectional links of the local I/O tree network 115 and the collective network 401. As explained above, these two networks share the same physical node-to-node links. Each tree network interface contains a single link interface to a parent, and a pair of interfaces to children of the node. As in the case of the torus network, each of the logical bidirectional links is implemented as a pair of unidirectional links, so the tree network interface actually contains six ports, two for the parent and four for the two children. Both the I/O nodes 111 and the compute nodes 112 use the tree network interface, but it is not necessarily true that all ports in the interface are connected. Some of the nodes will have no children or only one child, and the single root node 402 of the collective network will have no parent.

Tree network interface 510 includes or is closely coupled to a dedicated arithmetic logic unit (ALU) 513 for performing certain mathematical reductions of data being gathered up the tree. ALU 513 performs a limited set of simple integer arithmetic and logical operations on data. For example, ALU 513 may perform such operations as integer addition, integer maximum, bitwise logical AND, OR and XOR, etc. In general, the operands of operations performed by ALU 513 are obtained from the child nodes of the node performing the operation, and from the node itself, and the result is then forwarded to the parent of the node performing the operation. For example, suppose it is desired to find a sum of a respective nodal state value from each compute node in the compute core 111. Beginning with the leaf nodes, each node adds the state values, if any, received from its children to its own state value, and transmits the result to its parent. When a data packet containing a partial sum reaches an I/O node, the I/O node simply forwards it on to the next node of the collective network, without changing any of the data. When the resultant data packet reaches the root node and the state value sum contained therein is added to the root node's value, the resulting sum is the sum of all state values from the compute nodes. Similar operations can be performed using other mathematical functions in ALU 513. By providing a dedicated ALU in the tree network interface, global reduction operations can be performed very efficiently, with minimal interference to processes executing in processor cores 503. A data packet representing partial reduction data arrives in the tree network interface from a child, provides operands for ALU 513, and a successor packet with resultant data is forwarded up the tree to the node's parent from tree network interface, without the data ever having to enter the node's memory 505, 502 or cache 504.

Barrier network interface 511 provides an interface to barrier network 116, and provides global interrupt and barrier capability to the compute nodes. The barrier network is a set of four independent channels logically coupled to all nodes which reflect a global logical OR of the input from every node. Inverted logic can be used to produce a global AND. The barrier network can be used as a "barrier" for process synchronization, which prevents a set of nodes from proceeding past a certain execution stop point until all nodes have reached the stop point as indicated by the signals on the barrier. It can also be used as a global interrupt.

Each compute node 112 comprises a single addressable nodal memory, which is physically embodied as on-chip memory 505 and external memory 502. From a hardware standpoint, all of nodal memory is accessible by either processor core 503A, 503B. Each compute node can operate in either coprocessor mode or virtual node mode, independently of the operating modes of the other compute nodes. When operating in coprocessor mode, the processor cores of a compute node do not execute independent threads. Processor Core A 503A acts as a primary processor for executing the user application sub-process assigned to its node, while Processor Core B 503B acts as a secondary processor which handles certain operations (particularly communications related operations) on behalf of the primary processor. When operating in virtual node mode, the physical node is logically divided into two "virtual nodes" capable of independent thread execution. I.e., in virtual node mode, nodal memory is partitioned between the two processors, and each processor core executes its own user application sub-process independently and independently maintains process state in its own partition, although these sub-processes may be, and usually are, separate sub-processes of a common user application. Because each node effectively functions as two virtual nodes, the two processor cores of the virtual node constitute a fourth dimension of the logical three-dimensional lattice 201. I.e., to specify a particular virtual node (a particular processor core and its associated subdivision of local memory), it is necessary to specify an x, y and z coordinate of the node (three dimensions), plus a virtual node (either A or B) within the node (the fourth dimension).

While a system having certain types of nodes and certain inter-nodal communications structures is shown in FIGS. 1-4, and a typical node having two processor cores and various other structures is shown in FIG. 5, it should be understood that FIGS. 1-5 are intended only as a simplified example of one possible configuration of a massively parallel system for illustrative purposes, that the number and types of possible devices in such a configuration may vary, and that the system often includes additional devices not shown. In particular, the number of dimensions in a logical matrix or lattice for inter-nodal communication might vary; a system might have other and/or additional communication paths; and a system might be designed having only a single processor for each node, with a number of processors greater than two, and/or without any capability to switch between a coprocessor mode and a virtual node mode. While various system components have been described and shown at a high level, it should be understood that a typical computer system contains many other components not shown, which are not essential to an understanding of the present invention. Furthermore, although a certain number and type of entities are shown in the simplified representations of FIGS. 1-5, it will be understood that the actual number of such entities may vary and in particular, that in a complex computer system environment, the number and complexity of such entities is typically much larger.

Nodal Routing Policies

Typically, computer system 100 is used to execute large applications in parallel on multiple nodes, meaning that each of multiple compute nodes 112 executes a respective portion (sub-process) of the application, having its own local one or more threads and maintaining its own local application state data. It is possible to allocate all of the compute nodes 112 to a single application, or to allocate some subset of the compute nodes to a single application, and thus execute multiple applications concurrently in separate subsets. Different sub-processes of a common application pass data among one another. The various networks described above are each used for specific purposes. But the primary vehicle for passing data generated by different sub-processes of the common application among the various compute nodes is torus network 201.

A data packet transmitted via torus network 201 may pass through one or more intermediate nodes en route to its final destination node. In the preferred embodiment, a software router function 515 in the original sending node determines an initial link on which to transmit the packet and routing policy for routing the packet through any intermediate nodes to its final destination. The routing policy is transmitted with the packet. Each intermediate node in the path determines a next link for routing the packet to its final destination node, based on the routing policy. The software router function is represented conceptually in FIG. 5 as a component of memory 505, it being understood that it may be cached in any of various caches for execution on a processor 503.

Each intermediate node in the path has six physical links on which it can re-transmit a received packet, and therefore the routing determination made in the intermediate node amounts to choosing one of the six links. Preferably, each intermediate node implements an implicit routing according to the specified routing policy, as described herein. The implicit routing implements two routing rules. The first rule is that a link requiring no more than a minimal number of hops (node traversals) to reach its ultimate destination is chosen. I.e., a link going in a direction away from the destination, and therefore ultimately requiring more hops, is rejected (even though it is possible that, due to congestion in the more direct path, such a path would be faster).

The second rule implements a sender-specified priority for choosing one among multiple links requiring the minimal number of hops. It will be noted that there can be at most three links requiring the minimal number of hops, since the other three must move in respective directions opposite one of the three. In the preferred embodiment, the priority is based on coordinate path (e.g. choose x-coordinate path first, then y-coordinate, then z-coordinate). There are six possible permutations of coordinate preference: (X,Y,Z), (X,Z,Y), (Y,X,Z), (Y,Z,X), (Z,X,Y), (Z,Y,X). One of these six routing policies is chosen by the original sending node, and this information is transmitted with the packet. When an intermediate node receives the packet, hardware logic in torus network interface 509 examines the destination coordinates to determine the coordinate directions in which any hops remain to be traversed. If more than one coordinate direction remains to be traversed, the torus network interface chooses an outbound link from the intermediate node based on the routing policy information (second rule priority) in the packet.

This simple implicit routing technique has the advantage of being easily implementable in hardware in the torus network interface 509 of intermediate nodes, and does not require messages to be stored in nodal memory of intermediate nodes while a software procedure executing on a processor 503 determines an appropriate routing. It will be observed that any of various alternative implicit routing techniques could be used. For example, a routing priority could be based on the number of remaining traversals in a coordinate axis (e.g., if the message has to traverse Nx links in the x-coordinate direction, Ny links in the y-coordinate direction, and Nz links in the z-coordinate direction, choose the link corresponding to the largest (or smallest) value of Nx, Ny or Nz, with some other priority being used to break a tie). Alternatively, the priority could be based on the traffic in the outbound buffers (e.g. choose the link having the fewest number of packets in its outbound buffer), with some other priority, such as one disclosed above, being used to break a tie. This latter alternative has a primitive capability to dynamically route to avoid contention, but since the node must base its routing priority solely on its own state, it is unable to see ahead on a path to avoid contention.

The original sending node chooses one of the six routing policy preferences according to the second rule above, and transmits this information with the packet. Various strategies are possible for choosing a routing policy preference in the original sending node. For example, a simple routing implementation is a fixed strategy of always choosing the same routing policy, such as (X,Y,Z), although other strategies could be used which could vary the choice. The original sending node also chooses the initial link on which to route the packet. By default, this initial link is chosen in accordance with the same routing policy preference transmitted with the packet, and in particular, the initial choice obeys both rules one and two above. In accordance with the preferred embodiment of the present invention, for at least some packets, the default strategy is altered when contention, either actual or projected, is detected in the initial link on the default path. In these circumstances, the sender is not constrained to choose a minimal path. When the default strategy is so altered, the sender will distribute subsequent traffic among multiple paths (initial links), which may include the default path. Where appropriate, the sender may use a "transporter node" technique of designating an intermediate node (the transporter node) in an alternative path as a destination for routing purposes, and upon reaching the transporter, the transporter node re-transmits the packet to the destination.

Although the technique described herein can be used generally in any circumstance in which there is contention on the default path, it is particularly intended to address situations in which the sender is generating a large volume of data for sending to a specific destination, and it is desirable to utilize the full bandwidth of the network by routing the data along multiple paths, even if some are not optimal paths.

Figure 6:
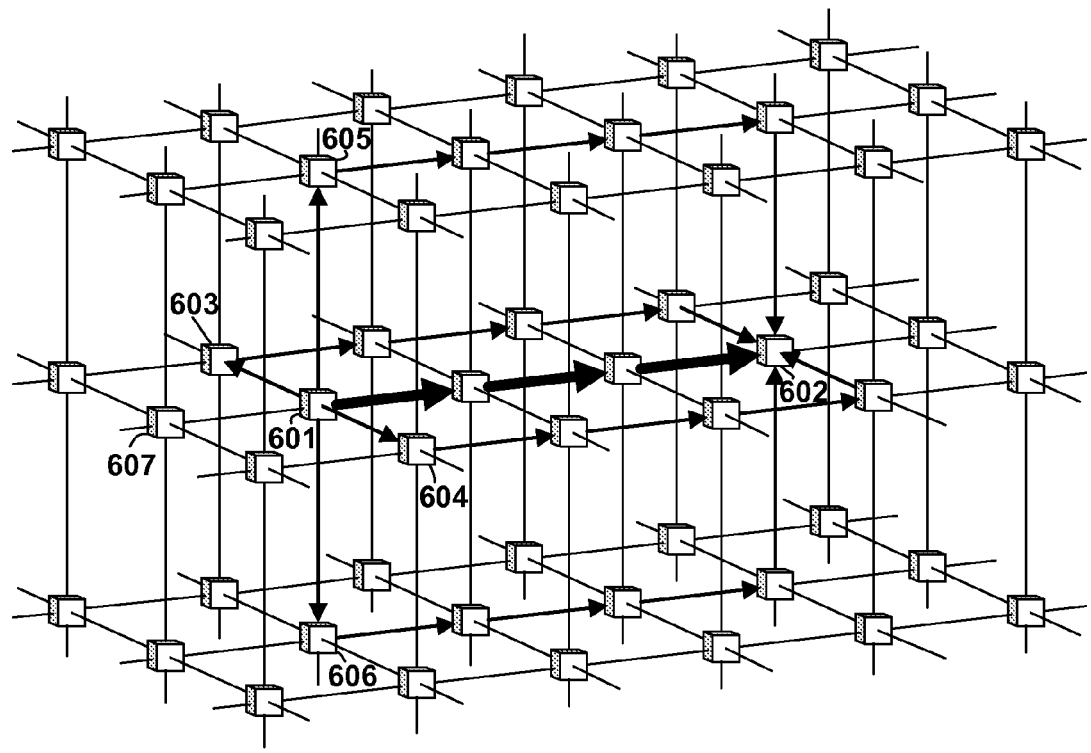
FIGS. 6 and 7 illustrate two simple examples of local network path overutilization which may be alleviated by a technique of routing using multiple alternative paths, in accordance with the preferred embodiment.

FIG. 6 illustrates a simple example of contention which may be alleviated by the technique described herein. FIG. 6 represents a relatively small portion of torus network 201, in which each cube represents a node. Node 601, having coordinates (X0,Y0,Z0), intends to send a large volume of data to node 602, having coordinates (X0+3),Y0,Z0), i.e., both nodes 601 and 602 are aligned on the x-axis. A default routing by a minimal path would require the data to be routed in the positive direction along the x-axis, requiring three hops. Such a routing is normally to be preferred. However, where the volume of data to be sent is large, and dwarfs the volume of data being transmitted on other links in the same local area, the three links directly between nodes 601 and 602 will carry heavy traffic while other links are relatively underutilized.

In accordance with the preferred embodiment of applicants' invention, in this situation the traffic can be distributed among multiple paths, including the direct line default path. I.e., some proportion of traffic is routed along the default path, while another portion is routed one hop in the y+ direction to node 603, thence three hops in the x+ direction, thence one hop in the y− direction to the destination; another portion is routed one hop in the y− direction to node 604, thence three hops in the x+ direction, thence one hop in the y+ direction to the destination; and similarly respective portions are routed in the z+ direction through node 605 and in the z− direction through node 606. Each alternate routing requires two additional hops, but if the links are being underutilized, the additional hops are outweighed by the increase in bandwidth made possible by splitting the original traffic burden five ways. It is even possible to form a sixth path by routing in the x− direction to node 607, and from there route around all the other paths, although such a routing requires at least 11 hops, i.e., 8 more than the default routing.

Figure 7:
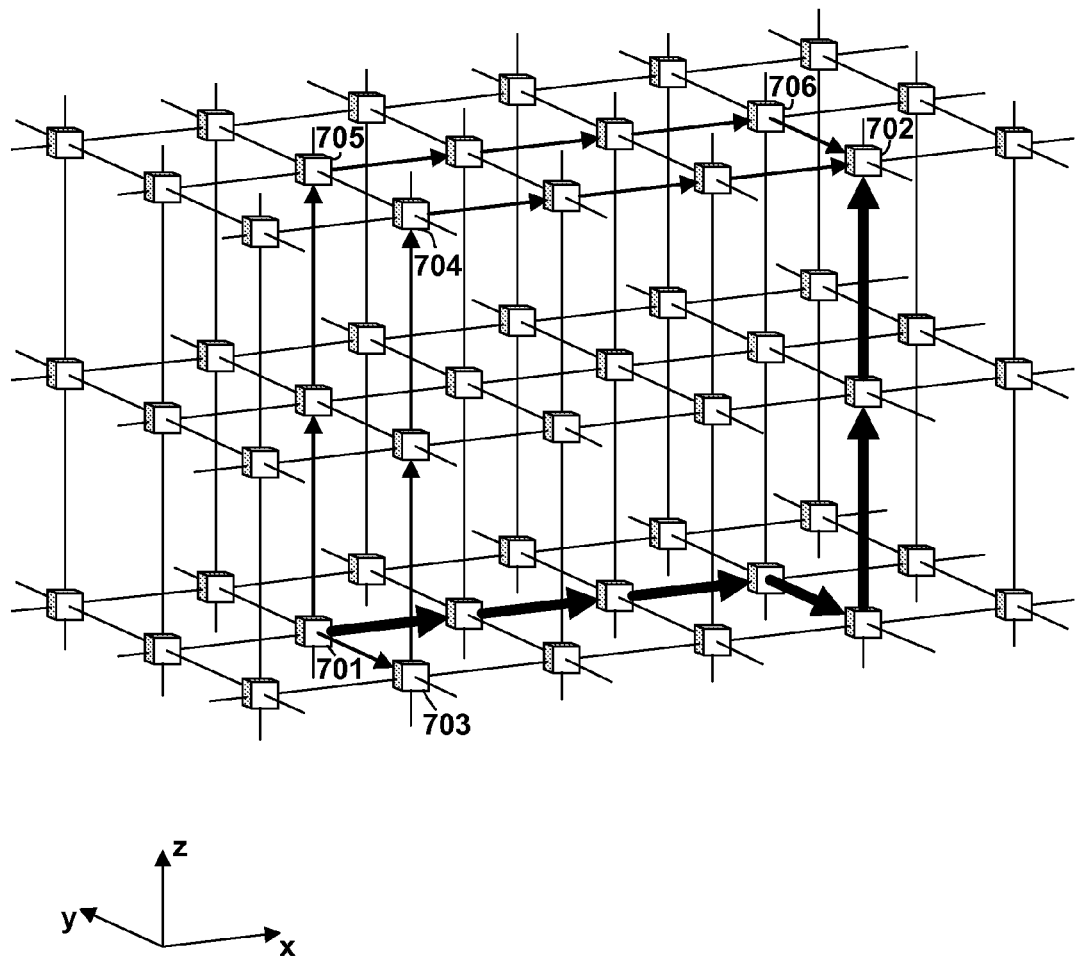

In the more general case where the source and destination are not aligned along any axis, one or more alternate paths exist which require a minimal number of hops, i.e., require the same number of hops as the default path. Such an example is illustrated in FIG. 7. Referring to FIG. 7, a source node 701 at coordinates (X0,Y0,Z0) must transmit a large volume of data to destination node 702 at coordinates ((X0+3),(Y0−1),(Z0+2)). A default path routes first in the x+ direction three hops, thence one hop in the y− direction, thence two hops in the z+ direction, as indicated by the heavily weighted arrows, requiring a total of 6 hops. Alternate, non-overlapping paths can be formed by routing first in the y− direction to node 703, then z+ direction to node 704, then x+ direction; or by routing first in the z+ direction to node 705, then x+ direction to node 706, then y− direction, as indicated by the arrows. Either of these alternative paths require 6 hops, the same as the default path. Additional alternative paths can be formed by routing in either the x−, y+ or z− direction, but any of these paths require at least 10 hops (i.e., at least 4 additional hops) if they are not to overlap one of the other paths.

Where the source node determines to route data along an alternative path which is also a minimal path, it can govern the routing of each packet by specifying the appropriate coordinate direction priority in the routing policy which is transmitted with the packet, as explained above. However, the low-level routing hardware in torus network interface 509 only routes along a minimal path, and therefore a different technique is required to route along a non-minimal alternative path. In accordance with the preferred embodiment, non-minimal alternative path routing is accomplished by routing through one or more transporter nodes. I.e, a packet is encapsulated within a shell packet which is routed to a transporter node on the desired alternative path. Upon reaching the transporter node, the shell packet is opened, and the encapsulated packet is re-transmitted to the destination node. It is possible to route through multiple transporter nodes if necessary by successive encapsulation. Such a technique is described in greater detail in commonly assigned U.S. patent application Ser. No. 11/539,300, filed Oct. 6, 2006, entitled "Method and Apparatus for Routing Data in an Inter-Nodal Communications Lattice of a Massively Parallel Computer System by Routing Through Transporter Nodes", which is herein incorporated by reference.

Figure 8:
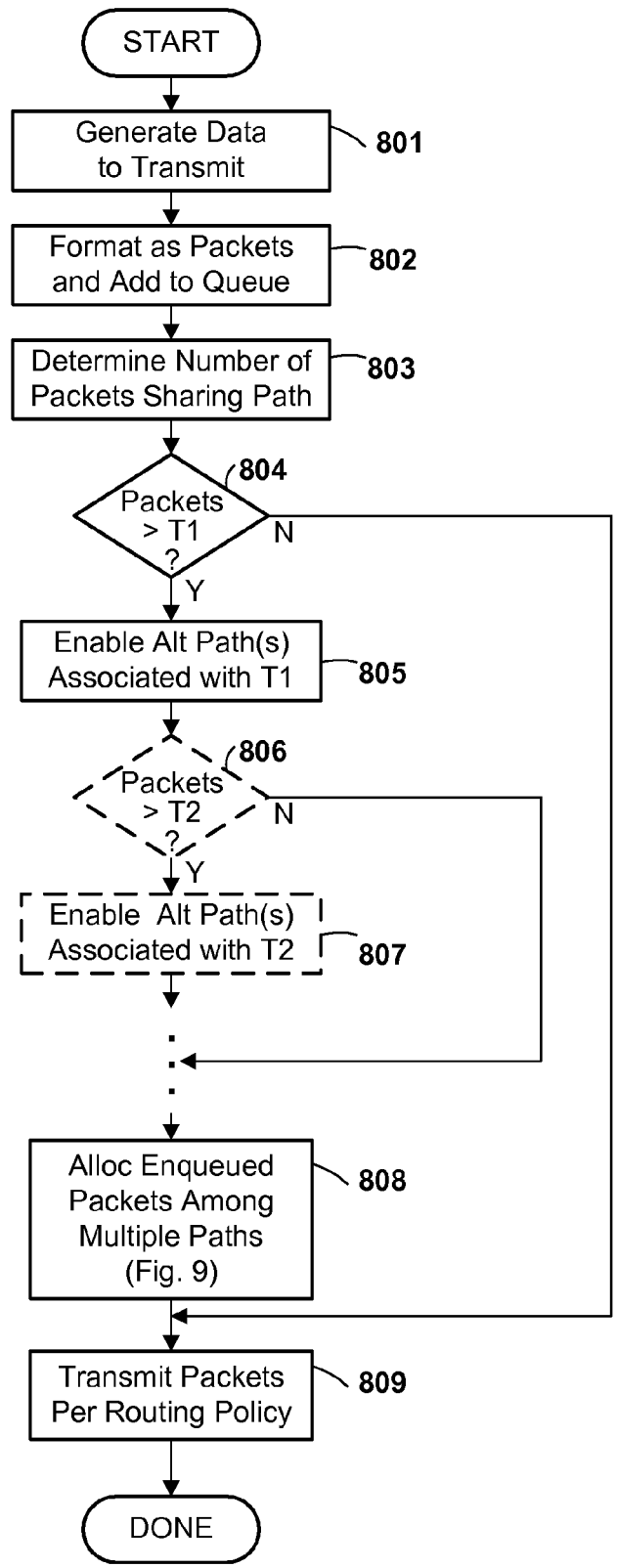
FIG. 8 is a high level flow diagram of routing actions taken within a source node to route data over a network, according to the preferred embodiment.

FIG. 8 is a high level flow diagram of the actions taken within a source node for data originating from the source node to be transmitted over torus network 201 to a destination node, according to the preferred embodiment. As shown in FIG. 8, an application sub-process executing in the source node generates data to be transmitted to a destination node (step 801). The source node formats the data for transmission as a plurality of packets and adds the packets to software queue 516 in memory 505 (step 802). These packets might be part of a single large message, or might be multiple messages. Some protocols may require that all packets of a single message arrive at the destination in order, which as a practical matter generally constrains them to follow the same path. Other protocols do not have this limitation. In the discussion below, it is assumed that packets may arrive out of order, i.e., may follow independent paths. Where packets of a single message are required to follow the same path, a similar result to that described herein can be achieved by transmitting large data volumes as multiple messages, and by distributing different messages among different alternative paths in the network.

When one or more packets are added to queue 516, the software router function 515 determines the queue size (e.g. number of packets) to be routed along the default path (or portion of a default path) of the additional packet(s) (step 803). The technique of the preferred embodiment is particularly intended to address situations in which a single sending node sends a large volume of data to a single destination node, and therefore in the preferred embodiment, the packets of interest are those which are to be routed to the same destination, and thus have an identical default path. However, the present invention is not necessarily limited to such situations, and in a more general case, it would alternatively be possible to consider packets which are being routed along at least one common link, even if the ultimate destinations (and hence full default paths) are not identical.

If the number of enqueued packets determined in step 803 does not exceed a threshold T1 associated with at least one alternative path for routing the packets, then the 'N' branch is taken from step 804, and the routing (i.e., default routing) associated with the packets is unchanged. If the routing remains unchanged while the packets stay on the queue, an asynchronous task will eventually remove the packets from the queue for placement in an appropriate buffer 514 and transmission across the torus network, represented as step 809. If the number of enqueued packets determined at step 803 exceeds T1, the 'Y' branch is taken at step 804, and the alternative path(s) associated with T1 are enabled as possible paths for distributing respective portions of the packet traffic (step 805).

In a first variation of the preferred embodiment, a single threshold T1 is associated with all possible alternative paths, and all such paths are enabled if the threshold is met. However, in an alternative variation of the preferred embodiment, multiple thresholds T1, T2, etc. of increasing magnitude are associated with respective alternative paths. Multiple thresholds may be used, for example, to take account of different path length. In particular, as explained above in the examples of FIGS. 6 and 7, some alternative paths will be minimal paths, requiring the same number of hops as the default path, while other alternative paths will require more than the minimal number of hops, the number of additional hops varying. An alternative path which requires additional hops necessarily imposes an incremental added burden on the torus network. For this reason, there is some justification for using a threshold related to the number of additional hops required, i.e., to using a lower threshold for an alternative path requiring a minimal number of paths than for an alternative path requiring more than a minimal number of hops. As represented in FIG. 8, optional step 806 compares the number of packets determined at step 803 to a second threshold T2, and step 807 enables one or more alternative paths associated with the second threshold if the second threshold is met. Additional optional steps (not shown) could employ additional thresholds for other alternative paths. It would even be possible to have a separate threshold for each alternative path.

In the preferred embodiment, each threshold T1, T2, etc is a fixed value. Specifically, it is preferred that either one fixed value T1 is used for all alternative paths, or that a pair of fixed values T1, T2 is used, one for the minimal paths and the other for non-minimal paths. Such fixed value are easy to implement and provide low overhead of execution. But it may alternatively be possible to provide one or more variable thresholds which take into account various factors, including not only the number of additional hops, but also some measure of utilization of each of the default path and/or each of the alternative paths conditions. Thus, in general, a threshold T(P) for an alternative path P may be represented as:

$$T(P)=K1+K2*(\#\_of\_addl\_hops)+K3*(\text{Utilization\_factor\_path\_}P)+K4*(\text{Utilization\_factor\_default\_path})$$

I.e., in general, T(P) will increase if there are more hops in path P, or as the current utilization of path P increases. The coefficient K4 is normally negative, i.e., the higher the utilization of the default path already, the lower should be the threshold. A "utilization factor" could be anything which measures, approximates, or is correlated to the volume of traffic on the corresponding path (or some measurable portion of it). For example, a utilization factor could include any of: (a) the size of the corresponding buffer 514 for the immediate link in the path; (b) the number of packets sent on the immediate link in a recent time interval; and/or (c) a propagation time for a packet as measured by a pacing packet (acknowledgment) returned to the sending node from the receiving node. Although certain utilization factors are listed by way of example, it will be understood that there are many alternative possible ways to measure utilization of a path or link.

If one or more thresholds has been met, the router 515 allocates the enqueued packets among the default path and the one or more alternative paths enabled by their corresponding threshold(s). This process is represented in FIG. 8 as step 808, and is shown in greater detail in FIG. 9. Allocating the enqueued packets among different paths amounts to changing the routing for at least some of the enqueued packets. An asynchronous process then transfers the packets from queue 516 to the appropriate buffers 514 according to the respective routing of each packet, for transmission along the selected default or alternative path, represented in FIG. 8 as step 809.

Figure 9:
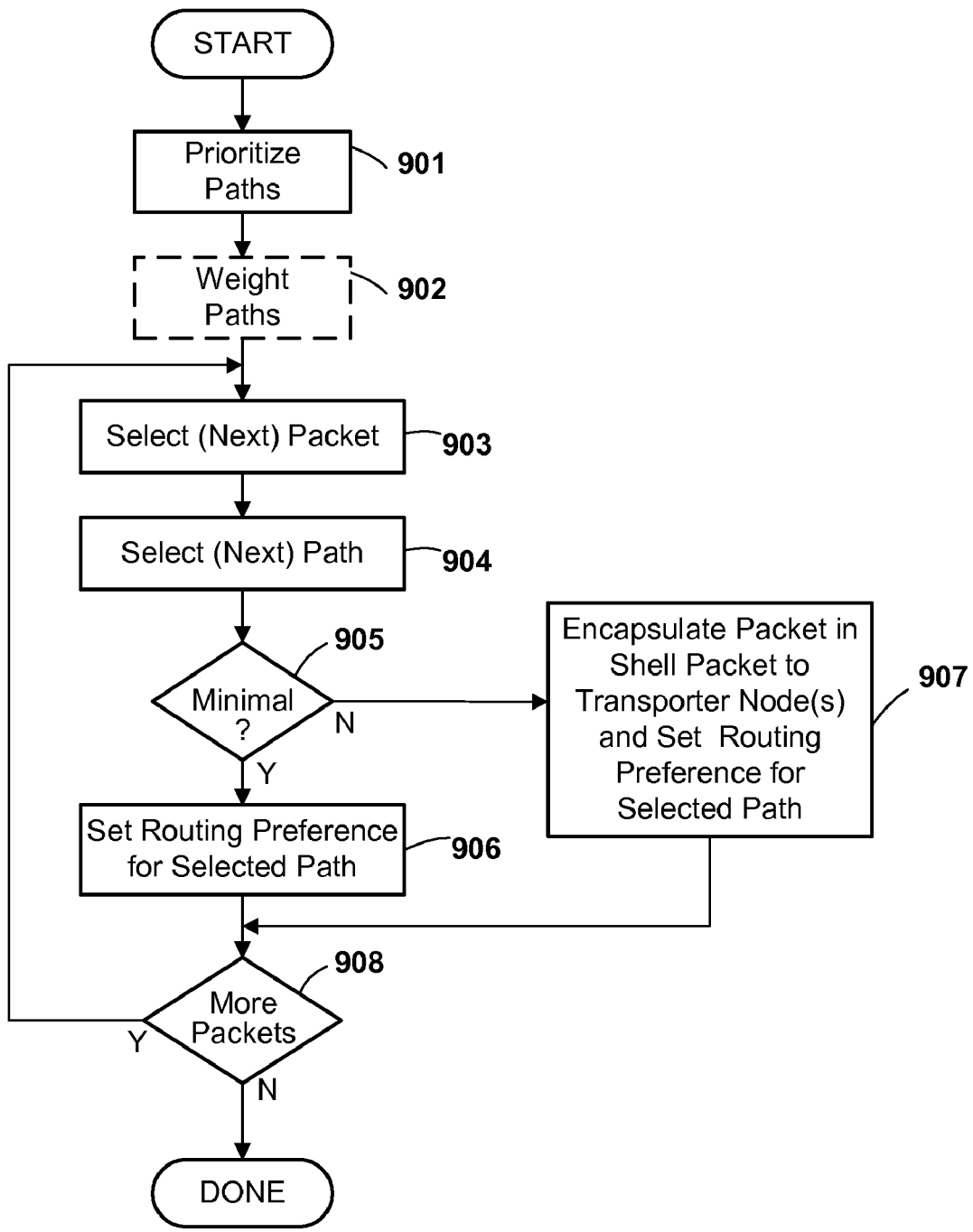
FIG. 9 is a flow diagram showing in greater detail a process of allocating multiple data packets to be transmitted between a source and a destination to multiple different paths, according to the preferred embodiment.

FIG. 9 is a flow diagram showing in greater detail a process of allocating multiple data packets to be transmitted between a source and a destination to multiple different paths, according to the preferred embodiment. Referring to FIG. 9, the default path and the alternate paths which were enabled previously are prioritized using any appropriate priority scheme. (step 901). Preferably, the default path is the first priority, and other paths may be prioritized by number of hops (minimal paths being higher priority) and/or a utilization factor.

In the preferred embodiment, packets are allocated among the default and enabled alternative paths on a round-robin basis in order of priority, but it would alternatively be possible to weight some paths more than others, so that they receive more than a pro-rata share. Weighting is represented as optional step 902. As in the case of priority, weighting could be based on number of hops and/or utilization factor.

A next packet from queue 516 is then selected (step 903), and a next path (based on priority and/or weight) is selected (step 904) to be associated with the packet. Preferably, the selected paths are rotated round-robin, beginning with the highest priority (generally the default) path.

If the selected path is a minimal path, the 'Y' branch is taken from step 905. In this case, it is possible to route along the selected path simply by specifying a routing policy an as x,y,z axis preference order, as described above. The appropriate routing policy is thus associated with the packet (step 906), so that hardware will route the packet along the corresponding selected default or alternate path.

If the selected path is non-minimal, the 'N' branch is taken from step 905. In this case, it is necessary to route the packet through one or more transporter nodes to follow the selected alternate path (step 907). To route to a transporter node, the packet is encapsulated within a shell packet, and the shell packet is given a destination of the transporter node. When the shell reaches the transporter node, it will be opened, the encapsulated packet will be examined, and it will then be re-routed to its destination. The router in the source node may further need to specify the x,y,z axis preference order routing policy for both the encapsulated packet and the shell packet to assure appropriate routing. In some cases, it may be necessary to use more than one transporter node (i.e., a packet encapsulated within a shell, which is encapsulated within another shell) in order to conform to the selected alternate path.

If any more packets remain in the queue, the 'Y' branch is taken from step 908, and a next packet is selected for association with a path. When all packets have been associated with a path, the 'N' branch is taken from step 908 and distribution ends.

If additional packets for the same destination are placed in the queue during or shortly after the described process, they can likewise be distributed among the enabled paths in a round-robin manner. However, if no more packets are received for some sufficiently long time interval, the transaction should be regarded as complete, and additional packets generated and enqueued after that will not be distributed among multiple paths until the thresholds described earlier are again met.

Where the applicable protocol requires packets within a message to arrive in order, a similar effect can be achieved, at a coarser granularity, by associating each of a plurality of messages with a respective path in a similar manner.

It will be appreciated that many variations in routing details are possible within the general scope of a technique for detecting overutilization of a local path and routing around the overutilized links in a distributed manner. Certain variations are discussed below, it being understood that these are by way of example and not intended limit the scope of the present invention.

In the preferred embodiment, the detection of local path overutilization is performed based on information locally available to the source node, e.g. the size of its software queue or other factors relating to local buffer or link utilization. Such a technique can be implemented with little overhead, since it does not require that information be gathered from other nodes. However, it would alternatively be possible to make determinations of path overutilization based on information of a more global nature, which is gathered from multiple nodes and conveyed to the source node. Although the gathering of such information involves additional overhead, it does have the potential to provide a more complete picture of network utilization and thus support more accurate determinations with respect to use of alternative paths. An exemplary global network data gathering and analysis technique is described in U.S. patent application Ser. No. 11/539,248, filed Oct. 6, 2006, entitled "Method and Apparatus for Routing Data in an Inter-Nodal Communications Lattice of a Massively Parallel Computer System by Dynamic Global Mapping of Contended Links", which is herein incorporated by reference.

In the preferred embodiment, routing around an overutilized path is performed exclusively by the source node. However, it would also be possible for an intermediate node in a path to detect overutilization of a link, and to re-direct traffic otherwise intended for the link to multiple alternative paths. Such an alternative is not well supported by the architecture of the preferred embodiment, which routes pass-through packets in low-level hardware according to fixed rules, but could be accommodated more easily in different architectures which rely on software routing in intermediate nodes.

In the preferred embodiment, the default path is one of the multiple paths chosen for distributing packets. However, it would be possible to distribute packets only among alternative, non-default paths. For example, where different techniques are used for determining overutilization, which respond to existing overutilization of the default path by pass-through packets not originating in the source node, it may actually be desirable to avoid the default path altogether.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of computer-readable signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network. Examples of signal-bearing media are illustrated in FIG. 1 as memory 122 and storage devices 109A, 109B, 125, and in FIG. 5 as memory 505.

Although a specific embodiment of the invention has been disclosed along with certain alternatives, it will be recognized by those skilled in the art that additional variations in form and detail may be made within the scope of the following claims:

What is claimed is:

1. A method for inter-nodal packet routing in a parallel computer system, said parallel computer system comprising a plurality of nodes arranged in a regular lattice network of node-to-node communications links for inter-nodal communications, each node comprising at least one processor for executing a respective application sub-process and a nodal memory, said method comprising the steps of:

generating a plurality of packets for transmission by said network, each said packet to be transmitted from a respective source to a respective destination node, wherein at least some of said packets must traverse one or more respective intermediate nodes between the respective source node and the respective destination node;

at each of a plurality of said nodes of said parallel computer system automatically routing each packet of said plurality of packets from its respective source node to its respective destination node along said node-to-node communications links of said network using an automated routing strategy based on the arrangement of said regular lattice network;

identifying a subset of said plurality of packets to be routed along a first path from a first node to a second node of said parallel computer system, said first path comprising at least one said link, said subset comprising multiple said packets;

detecting an overutilization condition of said first path;

identifying at least one alternative path from said first node to said second node for use by packets of said subset of packets, each said at least one alternative path being different from said first path and from each other alternative path;

responsive to detecting said overutilization condition of said first path, assigning each packet of said subset of packets to a respective path of a plurality of paths, said plurality of paths including said at least one alternative path, wherein at least one respective packet of said subset of packets is assigned to each path of said plurality of paths; and automatically routing each packet of said subset of packets along its respective path as assigned by said assigning step, each of any intermediate nodes in each respective path using said automated routing strategy to automatically route each respective packet to a respective next node along its respective path.

2. The method of claim 1, wherein said plurality of paths includes said first path.

3. The method of claim 1, wherein said first path is a path having a minimal number of links between said first node and said second node, and at least one said alternative path is a path having a number of links greater than said minimal number.

4. The method of claim 1, wherein said step of detecting an overutilization condition of said first path comprises determining that a number of packets in said subset exceeds a pre-determined threshold.

5. The method of claim 4, wherein said pre-determined threshold varies depending on at least one of: (a) a volume of traffic in at least one said alternative path; and (b) a number of links in at least one said alternative path.

6. The method of claim 1, wherein a respective threshold is associated with each of a plurality of said alternative paths, each alternative path being identified as an alternative path for use by packets of said subset if the number of packets in said subset exceeds the respective threshold of the path, wherein at least some said thresholds are different.

7. The method of claim 1, wherein said step of assigning each packet of said subset of packets to a respective path of a plurality of paths comprises allocating packets of said subset to respective paths of said plurality of paths on a round robin basis.

8. The method of claim 1, wherein said steps of generating a plurality of packets, identifying a subset of said plurality of packets to be routed along a first path, detecting an overutilization condition of said first path, identifying at least one alternative path, and assigning each packet of said subset of packets to a respective path of a plurality of paths, are performed within said source node of said packets, said source node automatically routing each packet of said subset of packets along a first link of its respective path as assigned by said assigning step.

9. The method of claim 1, wherein each said path comprises a respective set of links, each said set of links having no links in common with any other said set of links.

10. A computer program product for inter-nodal packet routing in a parallel computer system, said parallel computer system comprising a plurality of nodes arranged in a regular lattice network of node-to-node communications links for inter-nodal communications, each node comprising at least one processor for executing a respective application sub-process and a nodal memory, said program product comprising:
a plurality of computer executable instructions tangibly recorded on computer-readable media, wherein said instructions, when executed by a first node of said computer system, cause the first node to perform the steps of:
identifying a subset of a plurality of packets for transmission by said network to be routed along a first path from said first node to a second node of said parallel computer, each packet of said plurality of packets to be transmitted from a respective source to a respective destination node, said first path comprising at least one said link, said subset comprising multiple said packets;
detecting an overutilization condition of said first path;
identifying at least one alternative path from said first node to said second node for use by packets of said subset of packets, each said at least one alternative path being different from said first path and from each other said alternative path;
responsive to detecting said overutilization condition of said first path, assigning each packet of said subset of packets to a respective path of a plurality of paths, said plurality of paths including said at least one alternative path, wherein at least one respective packet of said subset of packets is assigned to each path of said plurality of paths, wherein at least one of said first path and said at least one alternative path traverses one or more intermediate nodes between said first node and said second node; and
causing each packet of said subset of packets to be automatically routed along its respective path as assigned by said assigning step, each of any intermediate nodes in each respective path using an automated routing strategy based on the arrangement of said regular lattice network to automatically route each respective packet to a respective next node along its respective path.

11. The program product of claim 10, wherein said plurality of paths includes said first path.

12. The program product of claim 10, wherein each said packet of said subset is to be routed from said first node as a source node to said second node as a destination node.

13. The program product of claim 10, wherein said first path is a path having a minimal number of links between said first node and said second node, and at least one said alternative path is a path having a number of links greater than said minimal number.

14. The program product of claim 10, wherein said step of detecting an overutilization condition of said first path comprises determining that a number of packets in said subset exceeds a pre-determined threshold.

15. The program product of claim 14, wherein said pre-determined threshold varies depending on at least one of: (a) a volume of traffic in at least one said alternative path; and (b) a number of links in at least one said alternative path.

16. The program product of claim 10, wherein a respective threshold is associated with each of a plurality of said alternative paths, each alternative path being identified as an alternative path for use by packets of said subset if the number of packets in said subset exceeds the respective threshold of the path, wherein at least some said thresholds are different.

17. A parallel computer system, comprising:
a plurality of nodes, each node having at least one processor for executing a respective application sub-process and a memory accessible by the at least one processor;
a plurality of node-to-node communication links forming a regular lattice network for inter-nodal communications of application data;
a respective routing mechanism in each node of said plurality of nodes, each said routing mechanism automatically routing each packet of a respective plurality of packets from a respective source node to a respective destination node along said node-to-node communications links of said network using an automated routing strategy based on the arrangement of said regular lattice network;
wherein each routing mechanism includes a distribution function which, responsive to detecting an overutilization condition in a first path of said network running between a pair of nodes of said parallel computer system, allocates packets of a subset of packets to be routed between the pair of nodes among a plurality of different paths in said network running between the pair of nodes, each said packet being allocated to a respective one of said plurality of different paths, each said path being allocated at least one said packet, at least one said path traversing at least one respective intermediate node; and wherein each routing mechanism causes each said packet to be automatically routed to a respective next node along the respective path to which it is allocated by said distribution function using said automated routing strategy.

18. The parallel computer system of claim 17, wherein said plurality of nodes are arranged in a logical N-dimensional lattice for inter-nodal communication, each said communication link of said network coupling a respective first node with a respective second node, the respective first and second nodes having identical coordinates in all except a respective Mth of the N dimensions of said N-dimensional lattice, the respective first and second nodes being logical neighbors in the respective Mth coordinate dimension.

19. The parallel computer system of claim 17, wherein a first node of said pair of nodes is a source node and a second node of said pair of nodes is a destination node, said distribution function residing in said source node.

20. The parallel computer system of claim 17, wherein said first path is a path having a minimal number of links between said first node and said second node, and at least one said path of said plurality of different paths is a path having a number of links greater than said minimal number.

* * * * *